Patented Apr. 26, 1932

1,855,818

UNITED STATES PATENT OFFICE

HARRY M. BLINN, OF BALTIMORE, MARYLAND, ASSIGNOR TO DOUGHNUT MACHINE CORPORATION, OF NEW YORK, N. Y., A CORPORATION OF NEW YORK

SUGARED DOUGHNUT AND ITS MANUFACTURE

No Drawing.    Application filed April 26, 1929. Serial No. 358,437.

My invention relates to sugared doughnuts and the like, and is also concerned with their manufacture. As will appear hereinafter, my invention is particularly concerned with so-called "cake" doughnuts, in which lightening is effected by gases evolved or formed during the cooking, as distinguished from raised doughnuts, in which lightening is mainly effected prior to cooking, by gases evolved during an antecedent "proofing", as it is termed.

As is well known, cake doughnuts are made by frying formations of dough (generally annular) in hot cooking oil, grease or fat. The steam and other gases formed during the cooking give the doughnut a cellular structure. In escaping from the doughnut, these gases break through the walls of the cells from the interior of the doughnut outward, so that the doughnut has virtually continuous pores leading in from its surface to its center. When the doughnut is removed from the cooker, the escape of hot gases ceases; and as the doughnut cools, the gases remaining in the doughnut contract and even condense and a vacuum is formed in the pores, so that the grease clinging to the surface is drawn into the pores (as well as a quantity of air), leaving the doughnut with an apparently "dry", non-greasy surface. The doughnut is then usually sprinkled with powdered sugar. The grease seems not to penetrate the doughnut more than a short distance, and does not seal its pores. Apparently, the grease remains clinging to the walls of the pores close to the exterior.

As the surface of the doughnut remains porous, and as the powdered sugar has a decided affinity for grease, the grease in the pores of the doughnut is drawn out to the surface and saturates the sugar, discoloring it and giving the doughnut an unsightly, greasy appearance. Also, the air has free passage to and from the interior of the doughnut, and the water in the doughnut dries out to a greater or less extent. Within forty-eight hours after cooking, the doughnut becomes stale, and its flavor greatly deteriorated. My experience shows that in this staling and impairment of flavor the easy access of air to the interior of the doughnut is an important factor.

I have discovered a way of avoiding these drawbacks of present practice, by interposing a barrier between the sugar and the grease in the doughnut. This may be associated either with the doughnut or with the sugar. In the first case, the barrier may take the form of an impervious sealing of the pores of the doughnut; in the second case, it may consist of an oil-repellent on the particles of sugar. In either case, the substance employed may be any suitable substance which can be applied to the doughnut (before sugaring it) to practically seal its pores against exudation from within, or against passage of air, or to the sugar particles to practically prevent the grease from saturating or "wetting" them, and which will not render the doughnut inedible or unpalatable, or produce any other deleterious effect. Some such substances, indeed, have a real food value in themselves, and may even impart an agreeable flavor to the doughnut, improve its keeping qualities, or produce other beneficial effects.

I will now describe illustrative examples of these two ways of carrying out my invention.

*Sealing the pores of the doughnut*

As the doughnut comes from the cooker, and almost immediately or very soon after the grease has soaked in and disappeared from its surface as above described, I may treat the doughnut with an aqueous solution of a gummy substance,—particularly a carbohydrate such as dextrine, starch, agar-agar, gum-arabic, or other edible gum. Such carbohydrate materials lend themselves especially to this purpose because they are in general safe and satisfactory as foods; do not coagulate or otherwise deteriorate with heat; and form a film or coating which is impervious, repellent, or retardant to exudation of grease or moisture in the doughnut, and (in many instances) of a tough, adherent character, so as not to be readily broken or scaled off. In general, a ten per cent solution of the substance employed (by weight) is satisfactory; but very considerable variation from this proportion is permissible. Egg albumen may also be used (in the form of an aqueous solution of the same strength as mentioned above), provided overheating of the solution to an albumen-coagulating temperature can be avoided. As the doughnut has a surface temperature of about 400° F. as it comes from the cooker, and as the albumen coagulates when a critical temperature of about 120° F. is exceeded, care is required: i. e., the albumen solution must not be applied until the doughnut has cooled to such a degree as to make overheating practically impossible.

One satisfactory way of applying the solution of albumen or other substance is to spray it on the hot doughnut. However, any other way that will result in sealing the pores of the doughnut with a small amount of the substance may be used, such as momentary or practically instantaneous immersion of the doughnut in the solution. This assures coating of the doughnut all over with the solution and thus insures substantially hermetically sealing it, all over, with the film formed on its surface or the filling drawn into its pores.

The grease-repellent substance thus employed need not, of course, be water-soluble like the carbohydrates mentioned; nor need it be used in solution at all. On the contrary, materials that can be applied molten may be employed, such as any edible or innocuous grease that will remain solid at atmospheric temperatures and thus form an oil-retardant film on the doughnut. For example, high-melting fats may be used,—or even a very thin film of paraffine.

As a result of the treatment, the substance (as it would appear) is partly drawn into the pores of the doughnut, and partly remains on its surface as a thin, dry, inconspicuous film or coating that shows little or no tendency to crack or peel; at any rate, the pores are effectually sealed against exudation of grease or moisture, as well as against influx of air and drying out.

Then, after the doughnut has dried off, it may be sprinkled or dusted with powdered sugar in the usual way. The sugar will not be affected by the grease in the doughnut, because of the barrier interposed by the added substance which seals the pores of the doughnut.

*Rendering the sugar grease-repellent*

To render the sugar grease-repellent, it is preferably treated with a grease-repellent agent before being applied to the doughnut. In this way, the sugar particles are charged and even coated or covered with a film of the repellent substance employed, which thus forms an effective barrier between the sugar and the grease in the doughnut.

A suitable substance for this purpose is glycerine, preferably used with the addition of some water. About 5% glycerine, 1% water and 94% powdered sugar will be found satisfactory,—though these proportions may be varied considerably if desired. The glycerine and water may be first mixed together and then mixed thoroughly with the sugar. This does not impair its powdery quality. It may be sprinkled or dusted on the doughnuts as or after they come from the cooker, in the usual manner.

While this method prevents contamination of the sugar with grease, it does not, of course, afford the doughnut the protection against staling that is afforded by sealing its pores as described above.

If desired, a double barrier may be interposed between the sugar and the grease in the doughnut, by using my grease-repellent sugar to dust or "sugar" doughnuts whose pores have been sealed (as described above) against exudation of grease.

Having thus described my invention, I claim:—

1. As an article of manufacture, a grease-fried cake doughnut externally dusted with sugar, with a grease-repellent medium interposed between the sugar particles and the cooking grease taken up by the doughnut and thus protecting the sugar from contamination with the grease.

2. As an article of maunfacture, a grease-fried cake doughnut hermetically sealed, all over, with a grease-repellent medium and externally dusted with sugar over its thus-sealed surface, whereby the sugar is protected, by the interposed medium, against contamination with the cooking grease taken up by the doughnut.

3. As an article of manufacture, a grease-fried cake doughnut dusted with particles of sugar charged with an oil-repellent agent, and thus prevented from drawing out and absorbing the cooking grease taken up by the doughnut.

In testimony whereof, I have hereunto signed my name at Ellicott City, Md. this 24 day of April 1929.

HARRY M. BLINN.